US010712569B2

(12) United States Patent
Jiang et al.

(10) Patent No.: US 10,712,569 B2
(45) Date of Patent: Jul. 14, 2020

(54) TECHNOLOGIES FOR EFFICIENT HEAD-MOUNTED DISPLAY WITH PANCAKE LENSES

(71) Applicant: Intel Corporation, Santa Clara, CA (US)

(72) Inventors: Jun Jiang, Portland, OR (US); Zhiming Zhuang, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 15/935,009

(22) Filed: Mar. 25, 2018

(65) Prior Publication Data

US 2019/0049733 A1    Feb. 14, 2019

(51) Int. Cl.
| G02B 27/01 | (2006.01) |
| G02B 27/10 | (2006.01) |
| G02B 27/28 | (2006.01) |
| G02B 5/02 | (2006.01) |
| G02B 17/08 | (2006.01) |

(52) U.S. Cl.
CPC ....... *G02B 27/0172* (2013.01); *G02B 5/0231* (2013.01); *G02B 5/0263* (2013.01); *G02B 17/0856* (2013.01); *G02B 27/106* (2013.01); *G02B 27/28* (2013.01); *G02B 2027/011* (2013.01); *G02B 2027/0118* (2013.01); *G02B 2027/0123* (2013.01)

(58) Field of Classification Search
CPC .............. G02B 27/0172; G02B 5/0231; G02B 5/0263; G02B 17/0856; G02B 27/106; G02B 27/28; G02B 2027/011; G02B 2027/0118; G02B 2027/0123
See application file for complete search history.

(56) References Cited

U.S. PATENT DOCUMENTS

2003/0202253 A1* 10/2003 Coates ................ G02B 25/001
                                                                  359/643
2017/0255015 A1    9/2017 Geng et al.
2017/0358136 A1    12/2017 Gollier et al.

FOREIGN PATENT DOCUMENTS

DE      69733867       4/2006
EP       1357417       10/2003

OTHER PUBLICATIONS

Extended European search report for European patent application No. 19157039.9, dated Aug. 28, 2019 (10 pages).

* cited by examiner

*Primary Examiner* — Michael Pervan
(74) *Attorney, Agent, or Firm* — Barnes & Thornburg LLP

(57) ABSTRACT

Technologies for virtual reality display include a computing device coupled to a head-mounted display device. The head-mounted display includes a display panel, a pixel emission controller, and a pancake lens assembly. The display panel includes a display surface that emits light as multiple pixels. The pancake lens assembly includes folded optics to direct light to an eye box. The pixel emission controller applies an emission profile to each pixel of the light as a function of the position on the display surface of the corresponding pixel. The emission profile is determined based on an optical coupling between the position on the display surface through the pancake lens assembly to the eye box. The beam width of each pixel may decrease and the beam angle relative to an optical axis may increase as distance from the optical axis increases. Other embodiments are described and claimed.

23 Claims, 8 Drawing Sheets

TECHNOLOGIES FOR EFFICIENT HEAD-MOUNTED DISPLAY WITH PANCAKE LENSES

BACKGROUND

Current computing devices may use head-mounted displays for virtual reality experiences. Compelling virtual reality experiences may require a relatively high pixel density (resolution) with a wide field of view and a fast refresh rate. Typical head-mounted displays include one or more display screens that are magnified for view by the user with a single-element lens, such as an aspherical lens or Fresnel lens. To achieve a wide field of view (greater than about 100 degrees), typical head-mounted display solutions require a display screen of greater than about 2.9 inches across.

Pancake lenses are folded optical systems, typically including two or more lens elements that use light polarization control to bounce light between the lens elements multiple times. Pancake lenses may achieve a high numeric aperture with a relatively short focal length. Pancake lenses may have relatively poor optical efficiency due to polarization losses. For example, typical optical efficiency for a pancake lens system may be less than 20%.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
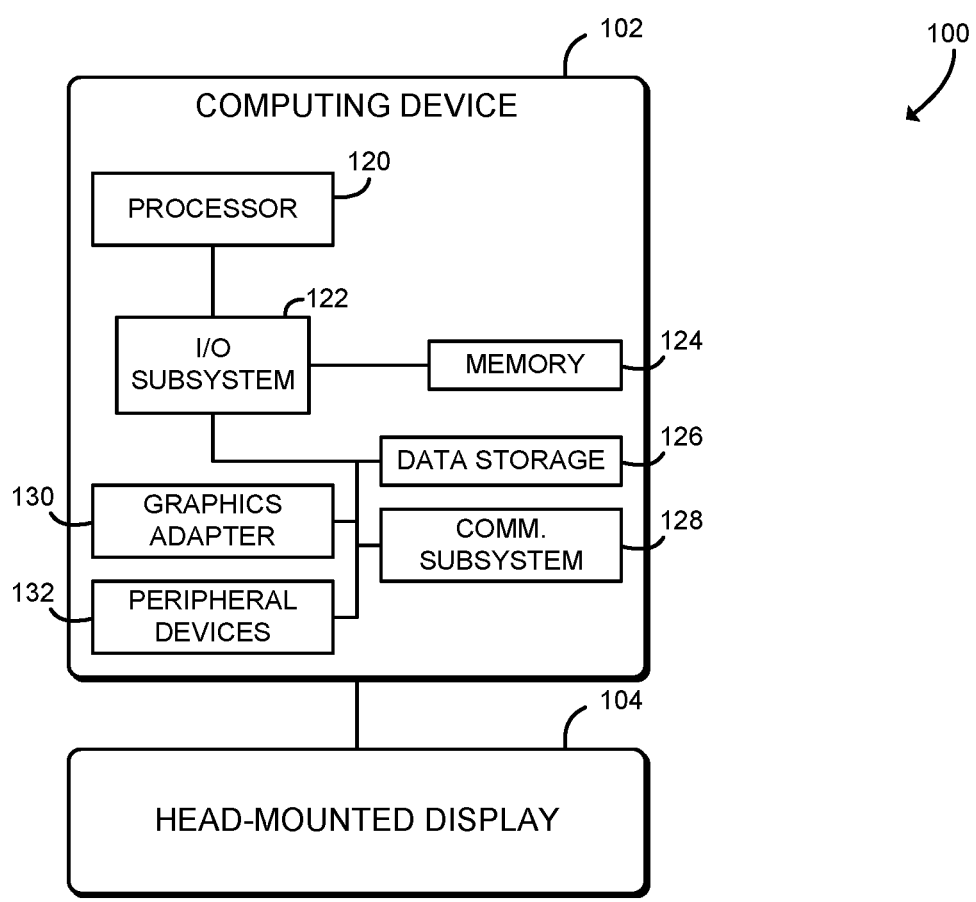
FIG. 1 is a simplified block diagram of at least one embodiment of a system for virtual reality applications with an efficient head-mounted display.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for virtual reality applications includes a computing device 102 coupled to a head-mounted display 104. The computing device 102 generates graphics for a virtual reality application or other application, and outputs the graphics to the head-mounted display 104. The head-mounted display 104 includes a display screen, a pixel emission controller, and a pancake lens. The display screen and pixel emission controller control the emission profile for each pixel based on the optical behavior of the pancake lens to minimize any light that is not coupled into an eye box for viewing by a user. For example, the pixel emission controller and the display screen may cause each pixel to have a narrow emission profile that minimizes light that is scattered, becomes noise, or otherwise lost within the head-mounted display 104. By using the pancake lens, the system 100 may be capable of displaying images with a large field of view (e.g., greater than 100 degrees) generated by a relatively small display screen (e.g., less than one inch across) with relatively high pixel density (e.g., greater than 3,000 pixels per inch). Accordingly, the system 100 may be capable of displaying images with better quality (i.e., better field of view and/or better pixel density) as compared to typical head-mounted displays. Using a smaller display screen may reduce cost as compared to typical head-mounted displays. Additionally, by using the pancake lens, the head-mounted display 104 may be more compact as compared to typical head-mounted displays that use single or compound aspheric lenses or Fresnel lenses. Further, by using improved emission profiles, the system 100 may improve brightness of the display, which may also improve energy efficiency as compared to typical head-mounted displays. For example, the system 100 may improve energy efficiency by two to three times as compared to typical head-mounted displays.

The computing device 102 may be embodied as any type of device capable of performing the functions described herein. For example, the computing device 102 may be embodied as, without limitation, a wearable computing device, computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 102 includes a processor 120, an I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. Additionally, in some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 102 may also include a communications subsystem 128, which may be embodied as any communication circuit, device, or collection thereof, capable of enabling communications between the computing device 102 and other remote devices over a computer network (not shown). The communications subsystem 128 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

As shown, the computing device 102 further includes a graphics adapter 130. The graphics adapter 130 may be embodied as any processor graphics, graphics processing unit (GPU), or other circuit or collection of circuits capable of rendering two-dimensional and/or three-dimensional graphics. The graphics adapter 130 may also include media processing circuitry, such as accelerated video decoding circuitry and/or accelerated video encoding circuitry. As described below, the graphics adapter 130 may generate graphics for virtual reality applications or other applications for output to a user with the head-mounted display 104. Additionally, although illustrated as a separate component, it should be understood that the in some embodiments the functionality of the graphics adapter 130 may be incorporated in one or more other components of the computing device 102, such as the processor 120, the I/O subsystem 122, a display controller, and/or other components of the computing device 102.

The computing device 102 may further include one or more peripheral devices 132. The peripheral devices 132 may include any number of additional input/output devices, interface devices, and/or other peripheral devices. For example, in some embodiments, the peripheral devices 132 may include a touch screen, graphics circuitry, an audio device, a microphone, a camera, an environmental sensor, a keyboard, a mouse, and/or other input/output devices, interface devices, and/or peripheral devices.

The head-mounted display 104 may be embodied as any type of device capable of performing the functions described herein, such as virtual reality goggles, smart glasses, or any other head-mounted wearable display device for displaying graphical information to a user. As described further below, the head-mounted display 104 may include one or more digital displays driven by the computing device 102 that are optically coupled to a pixel emission controller and a pancake lens assembly. The head-mounted display 104 may be coupled to the computing device 102 via a wired or wireless communication link. Additionally or alternatively, the computing device 102 and the head-mounted display 104 may be incorporated in a single device, such as a virtual reality display device with integrated computing capacity.

Figure 2:
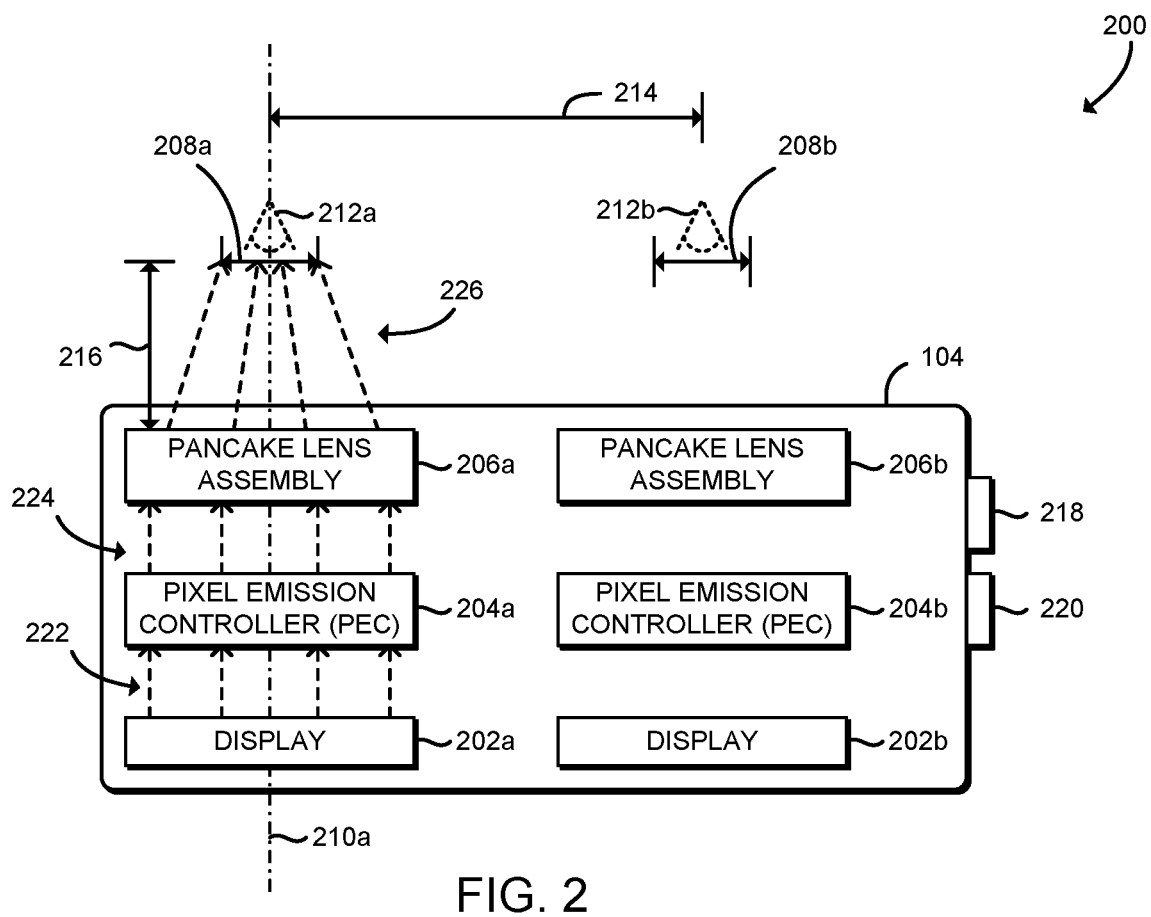
FIG. 2 is a simplified block diagram of at least one embodiment of a head-mounted display of the system of FIG. 1.

Referring now to FIG. 2, diagram 200 illustrates at least one embodiment of the head-mounted display 104 of the system 100. As shown, the head-mounted display 104 includes displays 202a, 202b, pixel emission controllers (PEC) 204a, 204b, and pancake lens assemblies 206a, 206b. The illustrative head-mounted display 104 includes a separate display 202, PEC 204, and pancake lens assembly 206 for each eye of the user; however, in some embodiments the head-mounted display 104 may include a single display 202, PEC 204, and/or pancake lens assembly 206, and/or a different number of each component.

Each display 202 may be embodied as any type of display capable of displaying digital information, such as a liquid crystal display (LCD), a light emitting diode (LED) display, a plasma display, a cathode ray tube (CRT), or other type of display device. As described above, the display 202 may display graphical information generated by the graphics adapter 130 or other component of the computing device 102. Illustratively, each display 202 may be embodied as a micro organic light emitting diode (OLED) display having a relatively small size (e.g., less than one inch across) and a relatively high pixel density (e.g., greater than 3,000 pixels per inch). Additionally or alternatively, in some embodiments each display 202 may be embodied as a backlit liquid crystal display (LCD) with relatively high pixel density. In addition to the display screen, the head-mounted display 104 may include a display controller or other display electronics. In some embodiments, the display 202 may be curved to further improve image quality and field of view.

Each PEC 204 may be embodied as any secondary optics configured to generate an optimal or otherwise improved emission profile for each pixel generated by the display 202. As described below, the PEC 204 may include one or more optical layers including micro lens arrays, micro prism arrays, grating elements, metasurface collimating optics and beam deflectors, or other collimating components and/or directional components.

Each pancake lens assembly 206 may be embodied as a folded optical system including one or more lenses, reflectors, or other optical elements that direct light to an eye box 208. As described further below, the pancake lens assembly 206 may include two lenses having four reflecting/refracting surfaces, and light may be reflected/refracted multiple times within the pancake lens assembly 206. Each pancake lens assembly 206 establishes an optical axis 210, which may be embodied as an imaginary line through a center of the pancake lens assembly 206. For clarity, the diagram 200 illustrates an optical axis 210a for the pancake lens assembly 206a; however, each pancake lens assembly 206 may establish an optical axis 210.

The eye box 208 is a region in which light is directed for viewing by a user. To use the head-mounted display 104, the user positions his or her eye 212 at the corresponding eye box 208. As shown, the illustrative head-mounted display 104 establishes two eye boxes 208a, 208b for each of the user's eyes 212a, 212b. Each eye box 208 is separated by an inter-pupillary distance (IPD) 214, and the eye boxes 208 are spaced away from the corresponding pancake lens assembly 206 by an eye relief 216, which may be large enough to accommodate the user's eyelashes or otherwise improve wearing comfort. The illustrative head-mounted display 104 includes controls 218, 220 which may be embodied as thumbwheels or other mechanical controls to adjust the IPD 214 and to adjust the focus of the pancake lens assemblies 206. Adjusting the focus of the pancake lens assemblies 206 may allow a user to use the head-mounted display 104 without wearing eyeglasses or other corrective lenses. Although illustrated with two manual controls 218, 220 it should be understood that in other embodiments the head-mounted display 104 may include a different arrangement or type of controls.

As shown in FIG. 2 and described further below, in use each display 202 outputs light 222 to the corresponding PEC 204. Each PEC 204 transmits light 224 to the corresponding pancake lens assembly 206. Each pancake lens assembly 206 transmits light 224 to the corresponding eye box 208 for viewing by the user. For clarity, FIG. 2 illustrates the light 222, 224, 226 for one eye only; it should be understood that light is transmitted similarly for both eyes.

Figure 3:
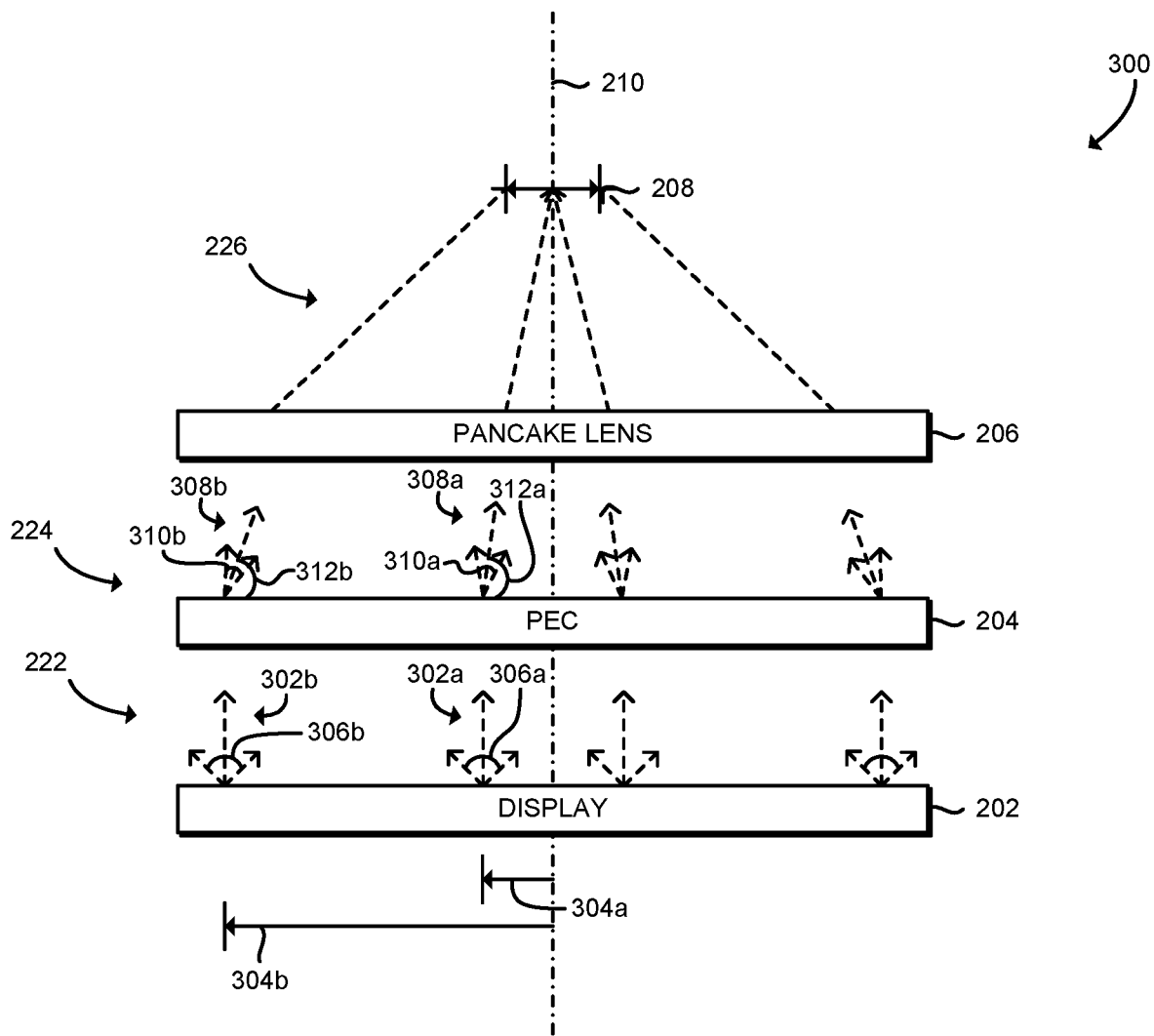
FIG. 3 is a simplified schematic diagram of at least one embodiment of light management performed by the head-mounted display of FIGS. 1-2.

Referring now to FIG. 3, diagram 300 is a simplified schematic diagram of at least one embodiment of light management performed by of the head-mounted display 104. As shown, the head mounted display includes the display panel 202, the PEC 204, and the pancake lens assembly 206.

The display panel 202 comprises a display surface that is configured to emit display light 222. The display light 222 includes multiple pixels that are each associated with a position on the display surface, illustrated as a distance 304 from the optical axis 210. Each of the pixels has an associated emission profile 302, which includes an associated beam width 306. In some embodiments, display panel 202 may include multiple emitters that emit the display light, such as multiple light emitting diodes (LEDs), with or without resonant cavities. The emission profile 302 of each emitter may have a beam width narrower than a Lambertian emission profile, or in some embodiments, each emitter may have a Lambertian or near-Lambertian emission profile. In some embodiments, the display panel 202 may include a backlight and a selectively transmissive layer such as a liquid crystal display (LCD). In some embodiments, the display panel 202 may include a polarizing layer such as a quantum rod film optically coupled to the backlight to linearly polarize light emitted by the backlight. In some embodiments, the display panel 202 may include a highly directional coupler optically coupled to the backlight. Light emitted by the backlight via the highly directional coupler has an emission profile with a narrow beam width.

The PEC 204 is optically coupled to the display panel 202. The PEC 204 is configured to apply an emission profile to each pixel of the display light 222, resulting in transmission of the display light 224. In some embodiments, the PEC 204 may be configured to apply an emission profile to a group of pixels, i.e., to perform emission control in a segmented fashion. Each pixel of the transmitted display light 224 has a corresponding emission profile 308, which includes a beam width 310 and a beam angle 312. The emission profile 308 of each pixel of the display light 224 is a function of an optical coupling between the position on the display surface associated with the pixel through the pancake lens assembly 206 to the eye box 208 (which may be determined as a function of one or more optical characteristics of the pancake lens assembly 206). The beam width 310 may be narrower than a Lambertian emission profile, for example, thirty degrees as opposed to 120 degrees full width half maxima (FWHM) for a Lambertian emission profile. In some embodiments, the beam width 310 of each pixel may be negatively correlated to the distance 304 of the corresponding position from the optical axis 210. For example, as shown in FIG. 3, the distance 304b is larger than the distance 304a; therefore, the beam width 310b of the emission profile 308b associated with the distance 304b may be smaller than the beam width 310a of the emission profile 308a associated with the distance 304a. The beam angle 312 may be determined as a function of the distance 304 and one or more optical characteristics of the pancake lens assembly 206. For example, in some embodiments, the beam angle 312 relative to the optical axis 210 may be positively correlated to the distance 304 of the corresponding position from the optical axis 210. For example, as shown in FIG. 3, the distance 304b is larger than the distance 304a; therefore, the beam angle 312b of the emission profile 308b associated with the distance 304b may be larger than the beam angle 312a of the emission profile 308a associated with the distance 304a. Of course, in other embodiments the beam width may have 312 a different relationship to the distance 304. The PEC 204 may include a collimating component such as a micro lens array or metasurface-based digital lens to reduce the beam width 310 of each of the emission profiles 308 and/or a directional component such as a micro prism array or metasurface-based directional coupler to modify the beam angle 312 of each of the emission profiles 308.

The pancake lens 206 is optically coupled to the PEC 204. The pancake lens 206 comprises folded optics configured to direct the display light to the eye box 208. In some embodiments, the display light 224 may be circularly polarized in response to transmission through the PEC 204. In those embodiments, the pancake lens assembly 206 may include a beam splitter lens that does not include an absorptive linear polarizer and a quarter wave film and a reflective polarizer lens that includes a quarter wave film and a reflective polarizer.

Figure 4:
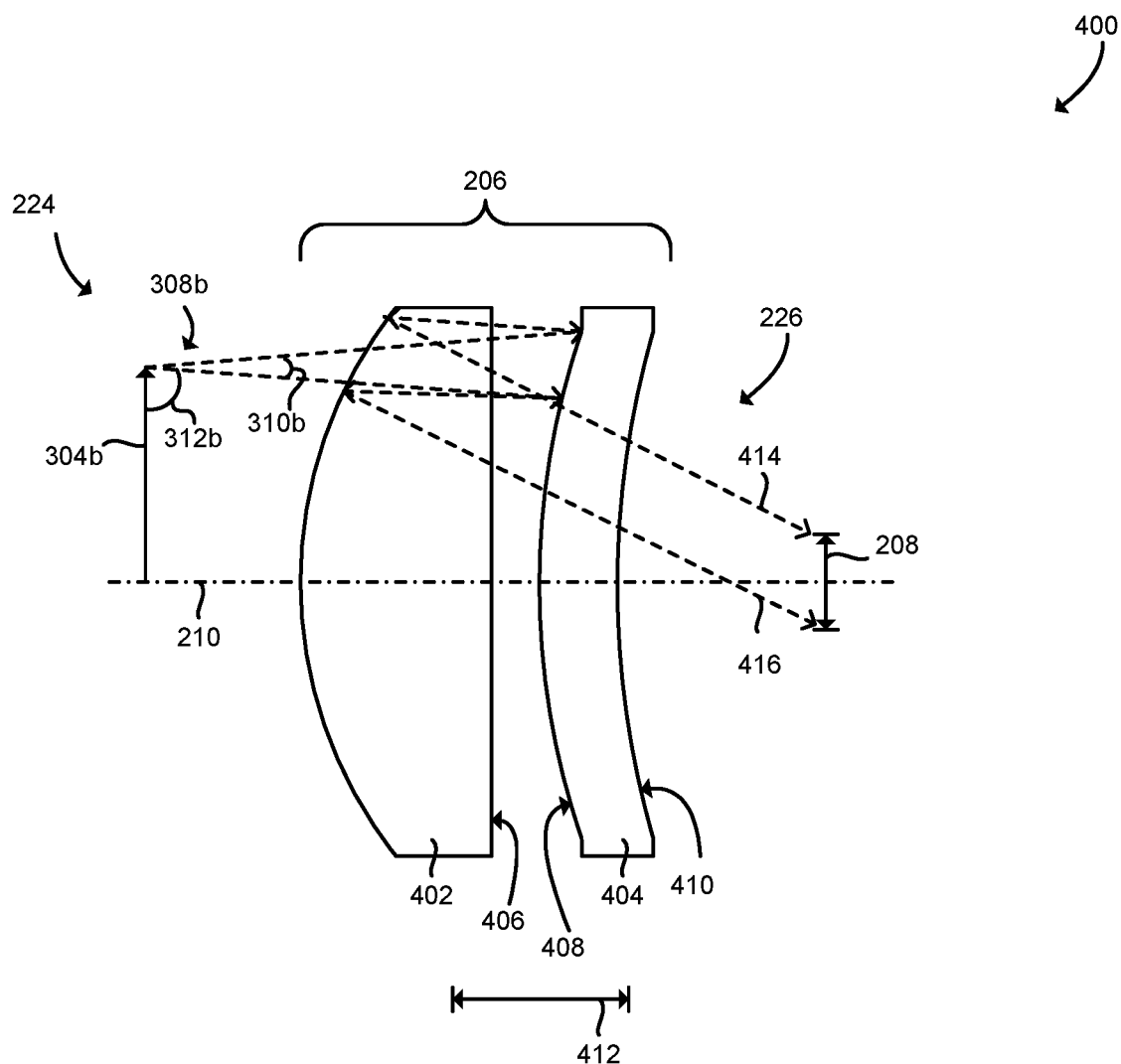
FIG. 4 is a simplified schematic diagram of at least one embodiment of a pancake lens assembly of the head-mounted display of FIGS. 1-3.

Referring now to FIG. 4, diagram 400 illustrates transmission of light through at least one embodiment of the pancake lens assembly 206. As shown, the incoming display light 224 includes the emission profile 308b emitted by the PEC 204 at the distance 304b from the optical axis 210. The illustrative pancake lens assembly 206 includes a beam splitter lens 402 and a reflective polarizer lens 404. The back side of the beam splitter lens 402 (farthest from the PEC 204) includes an anti-reflective coating 406. The front side of the reflective polarizer lens 404 (closest to the beam splitter lens 402) includes a quarter wave plate 408 and a reflective polarizer. The back side of the reflective polarizer lens 404 (farthest from the beam splitter lens 402) includes an anti-reflective coating 410. Illustratively, the incoming light 224 is circularly polarized and the front side of the beam splitter lens 402 (closest to the PEC 204) is coated as a 50/50 beam splitter mirror. In some embodiments, the front side of the beam splitter lens 402 may include an absorptive linear polarizer and a quarter wave plate. In those embodiments with the absorptive linear polarizer and the quarter wave plate, the emission from the display 202 may be non-polarized. The beam splitter lens 402 and the reflective polarizer lens 404 are separated by a distance 412. As described above in connection with FIG. 2, the distance 412 may be adjusted by the user to adjust the focus of the pancake lens 206 for use without eyeglasses or other corrective lenses. In some embodiments, the reflective polarizer lens 404 may be fixed, and the beam splitter lens 402 may be movable to adjust the distance 412.

FIG. 4 illustrates two rays 414, 416 that correspond to the beam width 310b of the emission profile 308b. As shown, the rays 414, 416 enter the front of the beam splitter lens 402 and are partially transmitted through the lens 402. The rays 414, 416 may also be partially reflected by the beam splitter lens 402 and lost, which is not shown in the diagram 400. The rays 414, 416 are transmitted through the beam splitter lens 402 and are next reflected by the front surface of the reflective polarizer lens 404. The quarter wave plate 408 of the reflective polarizer lens 404 changes the phase of the rays 414, 416, for example changing the rays 414, 416 from circularly polarized to linearly polarized. The rays 414, 416 are transmitted back through the beam splitter lens 402 and then reflected by the front surface of the beam splitter lens 402. The reflected rays 414, 416 are next transmitted through the reflective polarizer lens 404 to the eye box 208. Due to the polarization state change, the rays 414, 416 are not reflected by the front surface of the reflective polarizer lens 404. As shown, the rays 414, 416 are directed to either end of the eye box 208. Because the rays 414, 416 correspond to the extent of the beam width 310b of the emission profile 308b, light within the beam width of the emission profile 308b is directed to the eye box 208, where it is visible by the user. Light from the same pixel that is outside of the emission profile 308b may be scattered, appear as noise, or otherwise be lost. The emission profile 308b is generated by the display 202 and the PEC 204 to match the eye box 208 and thereby optimize or otherwise reduce the amount of light that is lost.

Figure 5:
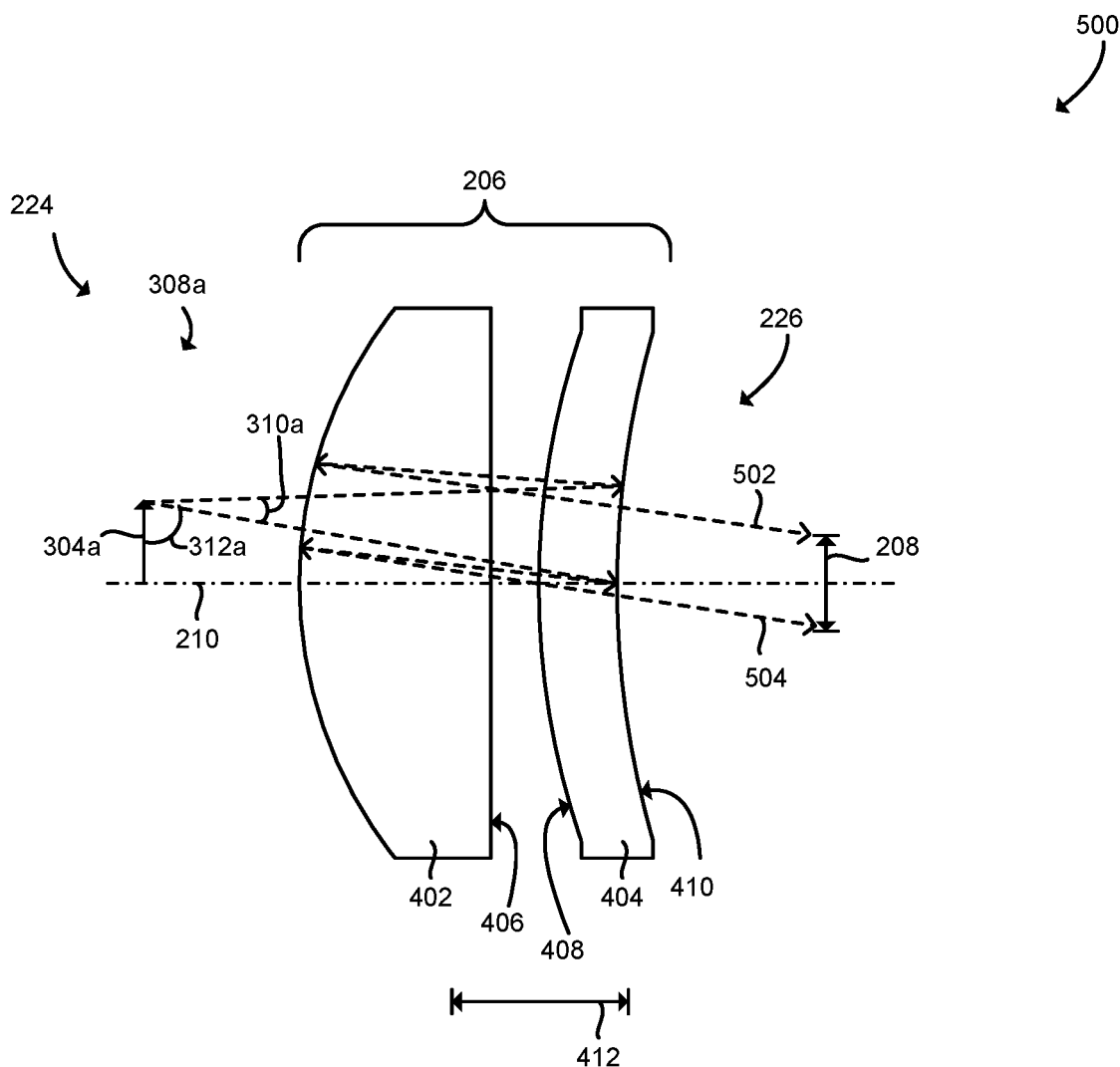
FIG. 5 is another simplified schematic diagram of at least one embodiment of a pancake lens assembly of the head-mounted display of FIGS. 1-3.

Referring now to FIG. 5, diagram 500 illustrates transmission of light through at least one embodiment of the pancake lens assembly 206. As shown, the incoming display light 224 includes the emission profile 308a emitted by the PEC 204 at the distance 304a from the optical axis 210. As described above, the emission profile 308a may be determined as a function of the distance 304a and the optics of the pancake lens assembly 206, and thus may be different from the emission profile 308b illustrated in FIG. 4. FIG. 5 illustrates two rays 502, 504 that correspond to the beam width 310a of the emission profile 308a. As shown, the rays 502, 504 enter the front of the beam splitter lens 402 and are partially transmitted through the lens 402. The rays 502, 504 may also be partially reflected by the beam splitter lens 402 and lost, which is not shown in the diagram 500. The rays 502, 504 are transmitted through the beam splitter lens 402 and are next reflected by the front surface of the reflective polarizer lens 404. The quarter wave plate 408 of the reflective polarizer lens 404 changes the phase of the rays 502, 504, for example changing the rays 502, 504 from circularly polarized to linearly polarized. The rays 502, 504 are transmitted back through the beam splitter lens 402 and then reflected by the front surface of the beam splitter lens 402. The reflected rays 502, 504 are next transmitted through the reflective polarizer lens 404 to the eye box 208. Due to the polarization state change, the rays 502, 504 are not reflected by the front surface of the reflective polarizer lens 404. As shown, the rays 502, 504 are directed to either end of the eye box 208. Because the rays 502, 504 correspond to the extent of the beam width 310a of the emission profile 308a, light within the beam width of the emission profile 308a is directed to the eye box 208, where it is visible by the user. Light from the same pixel that is outside of the emission profile 308a may be scattered, appear as noise, or otherwise be lost. The emission profile 308a is generated by the display 202 and the PEC 204 to match the eye box 208 and thereby optimize or otherwise reduce the amount of light that is lost.

Figure 6:
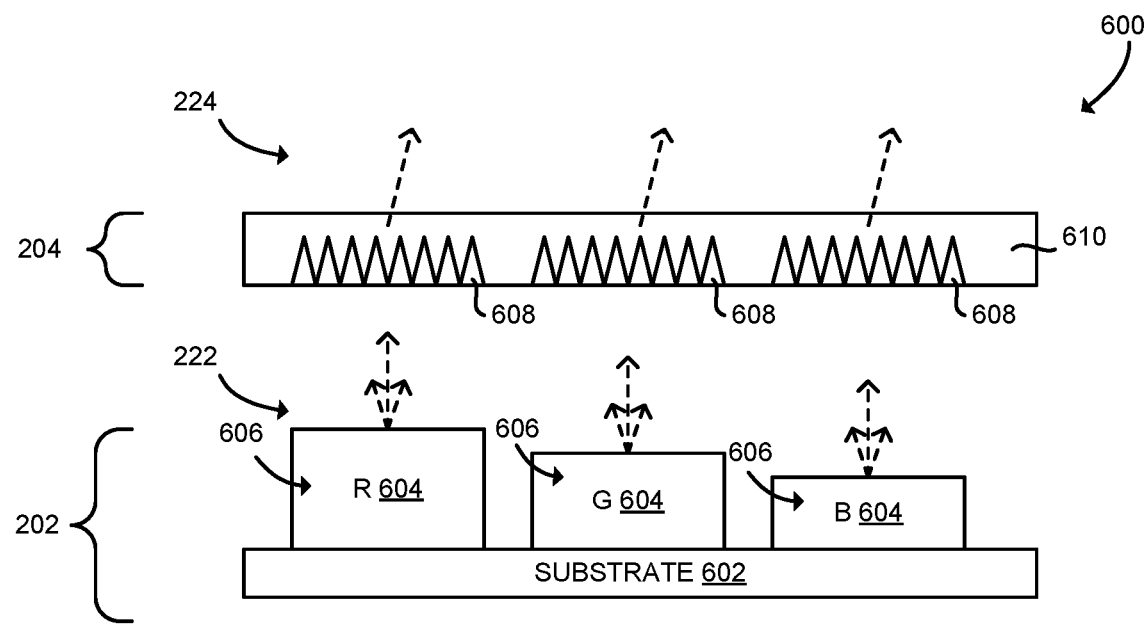
FIG. 6 is a simplified schematic diagram of at least one embodiment of a display screen and pixel emission controller of the head-mounted display of FIGS. 1-3.

Referring now to FIG. 6, diagram 600 shows least one embodiment of the display screen 202 and the PEC 204. The illustrative display screen 202 is a micro OLED display with a size of less than one inch across and a pixel density of greater than 3000 pixels per inch. The display screen 202 includes a substrate 602 coupled to multiple OLED subpixels 604. The diagram 600 illustrates three subpixels 604 (red, green, and blue); of course, the display screen 202 includes many more subpixels 604. Each of the subpixels 604 includes a resonant cavity 606. An LED subpixel 604 without a resonant cavity may have a Lambertian or near-Lambertian emission profile. Light may reflect within each resonant cavity 606 multiple times, causing the spectra and emission profile of the emitted light 222 to narrow considerably. For certain resonant cavity 606 designs, similar to those in a vertical-cavity surface emitting laser (VCSEL), the spectral and angular emission may be further refined to a very narrow range.

The illustrative PEC 204 includes a micro prism array 608 for each of the subpixels 604. The micro prism array 608 may be embodied as an integrated directional optical film including micro-prism arrays, grating elements, metasurface beam deflector or other directional component. The size of each prism element of the micro prism array 608 may be small enough so that it cannot be resolved by the magnifying power of the pancake lens 206. The micro prism arrays 608 are included in a glass cover 610. As shown, the micro prism array 608 may change the beam angle (direction) of the transmitted light 224. As described above in connection with FIGS. 4-5, the direction of each micro-prism array 608 may depend on the relative position of the corresponding subpixel 604 with respect to the pancake lens assembly 206.

Figure 7:
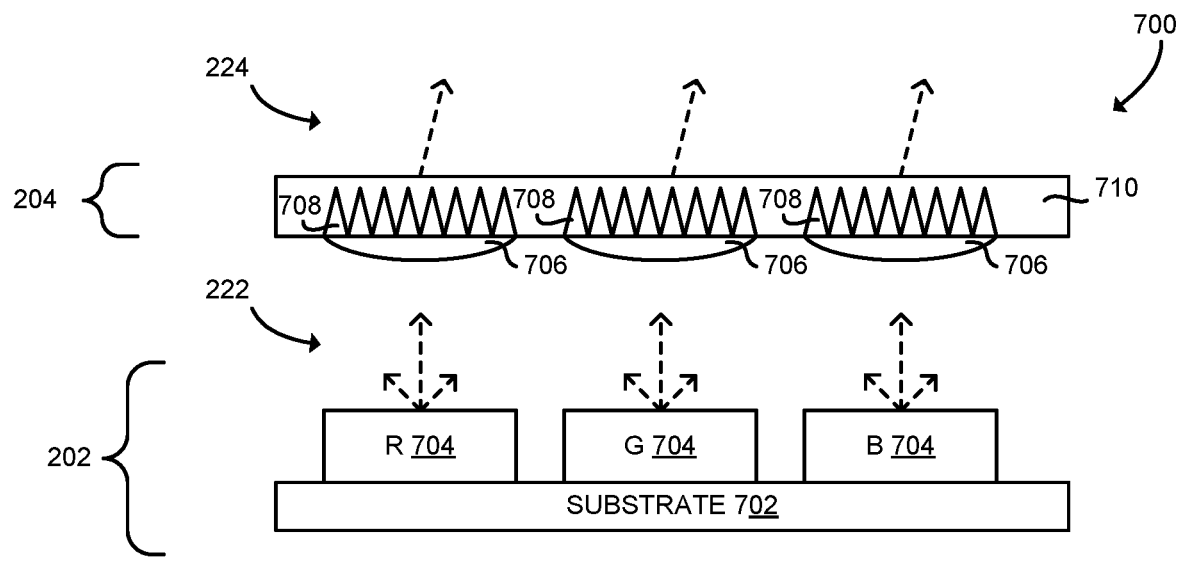
FIG. 7 is a simplified schematic diagram of at least one embodiment of a display screen and pixel emission controller of the head-mounted display of FIGS. 1-3.

Referring now to FIG. 7, diagram 700 shows least one embodiment of the display screen 202 and the PEC 204. Similar to FIG. 6, the illustrative display screen 202 of FIG. 7 is a micro OLED display with a size of less than one inch across and a pixel density of greater than 3000 pixels per inch. The display screen 202 includes a substrate 702 coupled to multiple OLED subpixels 704. The diagram 700 illustrates three subpixels 704 (red, green, and blue); of course, the display screen 202 includes many more subpixels 704. Each of the subpixels 704 does not include a resonant cavity and thus the emitted light 222 has a Lambertian or near-Lambertian emission profile.

The illustrative PEC 204 includes a micro lens array 706 and a micro prism array 708 for each of the subpixels 704. The micro prism array 708 may be embodied as an integrated directional optical film including micro-prism arrays, grating elements, or other directional component. As described above, the size of each prism element of the micro prism array 608 may be small enough so that it cannot be resolved by the magnifying power of the pancake lens 206. The micro lens array 706 and the micro prism array 708 are included in a layer 710, which may be embodied as a single layer with integrated micro lens array 706 and micro prism array 708, or as multiple layers, for example a separate micro lens array 706 layer and a micro prism array 708 layer. Additionally or alternatively, in some embodiments the PEC 204 may include multiple layers of meta-surface that function as collimator and deflector. The micro lens arrays 706 collimate the light emitted by the display 202, narrowing the emission profile (beam width) of each pixel of the emitted light 224. Additionally, the micro prism array 708 may change the beam angle (direction) of the transmitted light 224. As described above in connection with FIGS. 4-5, the beam width of each micro lens array 706 and the direction of each micro prism array 708 may depend on the relative position of the corresponding subpixel 704 with respect to the pancake lens assembly 206.

Figure 8:
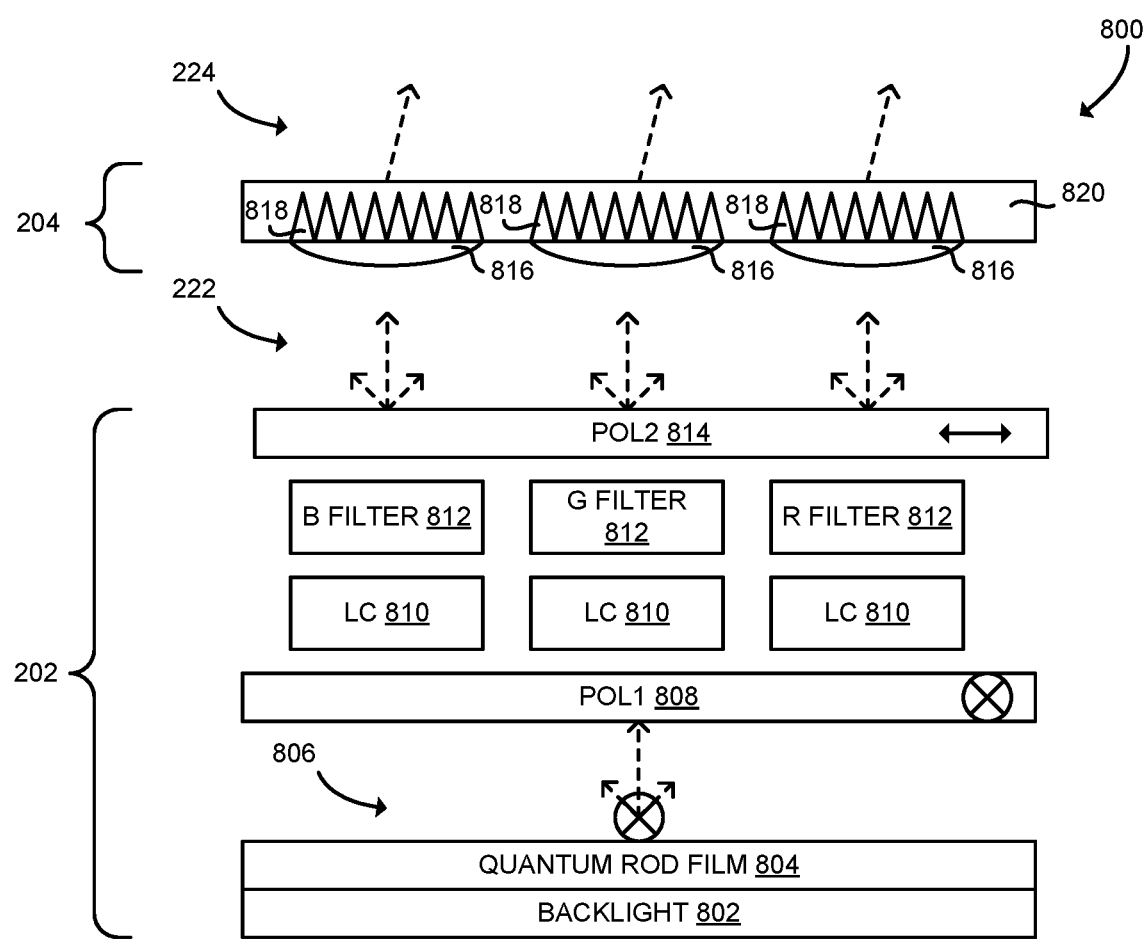
FIG. 8 is a simplified schematic diagram of at least one embodiment of a display screen and pixel emission controller of the head-mounted display of FIGS. 1-3.

Referring now to FIG. 8, diagram 800 shows least one embodiment of the display screen 202 and the PEC 204. The illustrative display screen 202 of FIG. 8 is a micro LCD display with a relatively high pixel density. As compared to the micro OLED of FIGS. 6 and 7, the micro LCD screen 202 may have a lower cost. The display screen 202 includes a backlight 802 coupled to a quantum rod film 804. Similar to quantum dot film, the quantum rod film 804 is also a wavelength down converter that converts short-wavelength incident light (e.g., ultraviolet or blue) into longer wavelength light (e.g., green and red). However, as compared to quantum dot film, when properly aligned, the quantum rod film 804 generates linearly polarized light 806. The display 202 further includes a polarizing layer 808, which is aligned with the polarization of the quantum rod film 804. It should be understood that although illustrated as including both a quantum rod film 804 and a polarizing layer 808, in some embodiments the display 202 may omit the polarizing layer 808 or use the quantum rod film as the polarizing layer 808. By emitting polarized light 806 by the backlight 802, the system 100 may reduce polarization losses in the LCD display 202 and reduce power consumption.

The display 202 further includes multiple liquid crystal cells 810 and color filters 812. The liquid crystal cells 810 may be considerably thin for improved response time. Typically, reducing liquid crystal cell gap reduces power efficiency for LCDs. However, due to the overall improved efficiency of the system 100, overall power consumption may be reduced by two to three times, even with the use of small liquid crystal cells with fast response times.

The display 202 further includes a polarizing layer 814, which is illustratively aligned perpendicular to the quantum rod film 804 and the polarizing layer 808. Additionally or alternatively, in some embodiments the display 202 may operate in a normally white mode, in which the polarizing layer 814 is aligned parallel to the quantum rod film 804 and the polarizing layer 808. The liquid crystal cells 810 are configured to selectively change the polarization angle of the light 806 emitted by the backlight 802, which selectively allows light to pass through the associated color filter 812 and be emitted from the display 202 as the light 222. The light 222 may be emitted with a Lambertian, near-Lambertian, or other relatively broad emission profile. In some embodiments, the polarizing layer 814 may be topped with a quarter wave film so that the light 222 is circularly polarized.

The illustrative PEC 204 includes a micro lens array 816 and a micro prism array 818 for each of the liquid crystal cells 810. The micro prism array 818 may be embodied as an integrated directional optical film including micro-prism arrays, grating elements, or other directional component. The micro lens arrays 816 and the micro prism arrays 818 may be included in multiple layers 820. Additionally or alternatively, in some embodiments the PEC 204 may include multiple layers of meta-surface that function as collimator and deflector. The micro lens arrays 816 collimate the light emitted by the display 202, narrowing the emission profile (beam width) of each pixel of the emitted light 224. Additionally, the micro prism array 818 may change the beam angle (direction) of the transmitted light 224. As described above in connection with FIGS. 4-5, the beam width of each micro lens array 816 and the direction of each micro prism array 818 may depend on the relative position of the corresponding liquid crystal cell 810 with respect to the pancake lens assembly 206.

Figure 9:
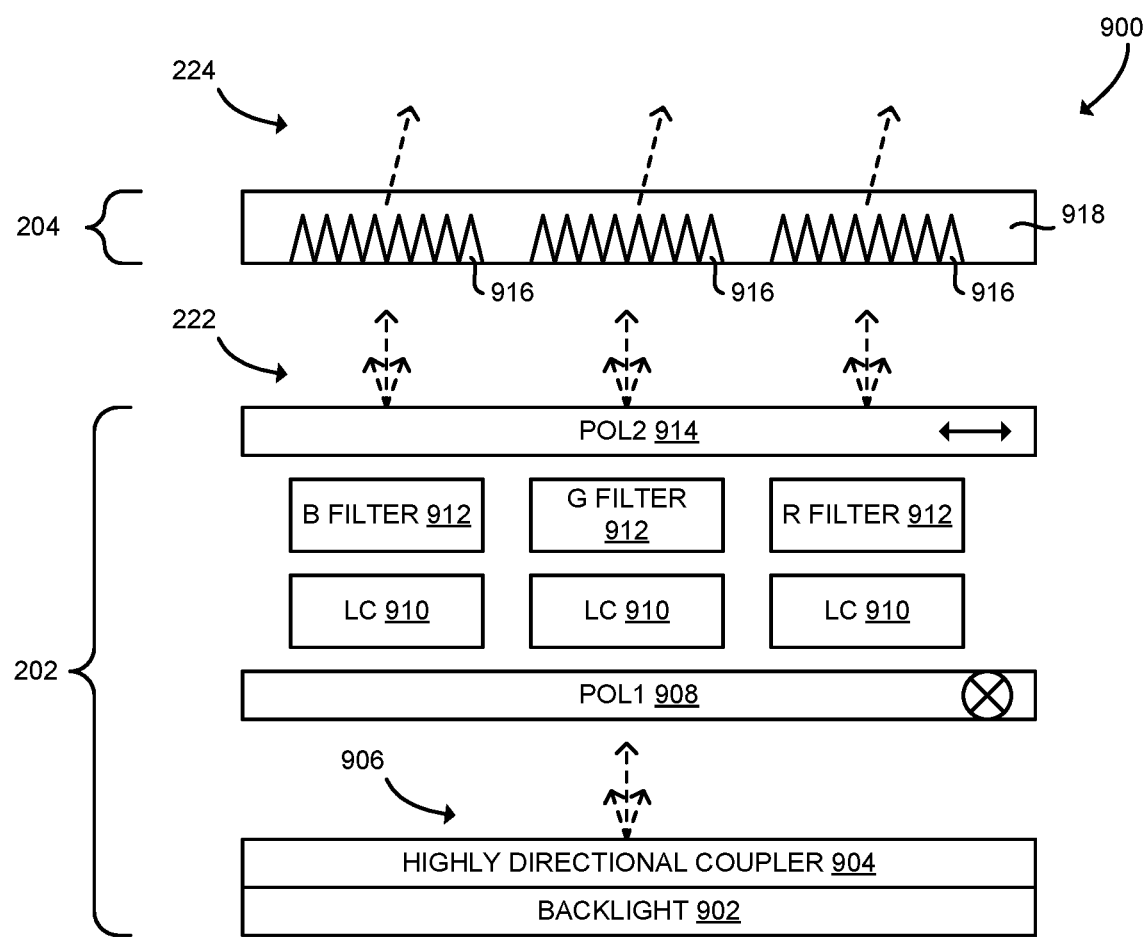
FIG. 9 is a simplified schematic diagram of at least one embodiment of a display screen and pixel emission controller of the head-mounted display of FIGS. 1-3.

Referring now to FIG. 9, diagram 900 shows least one embodiment of the display screen 202 and the PEC 204. Similar to FIG. 8, the illustrative display screen 202 of FIG. 9 is a micro LCD display with a relatively high pixel density. The display screen 202 includes a backlight 902 coupled to a highly directional coupler 904. Typical LCD backlights used, for example, in televisions, smart phones, computer screens, or other directly viewed devices may use a wide angle coupler that disperses the backlight output broadly, in order to produce wide viewing angles. In contrast, the highly directional coupler 904 produces light 906 with a narrow emission profile. The emission profile of the light 906 may be much narrower than a Lambertian profile.

The display 202 further includes a polarizing layer 908 that linearly polarizes the light 906 emitted by the highly directional coupler 904. The display 202 further includes multiple liquid crystal cells 910 and color filters 912. The liquid crystal cells 910 may be small for improved response time. Typically, reducing liquid crystal cell size reduces power efficiency for LCDs. However, due to the overall improved efficiency of the system 100, overall power consumption may be reduced by two to three times, even with the use of small liquid crystal cells with fast response times.

The display 202 further includes a polarizing layer 914, which is aligned perpendicular to the polarizing layer 908. The liquid crystal cells 910 are configured to selectively change the polarization angle of the light 906 passed through the polarizing layer 908, which selectively allows light to pass through the associated color filter 912 and be emitted from the display 202 as the light 222. As shown, the light 222 has a narrow emission profile. In some embodiments, the polarizing layer 914 may be topped with a quarter wave film so that the light 222 is circularly polarized.

The illustrative PEC 204 includes a micro prism array 916 for each of the liquid crystal cells 910. The micro prism array 916 may be embodied as an integrated directional optical film including micro-prism arrays, grating elements, or other directional component. The micro prism arrays 916 are included in a glass cover 918. As shown, the micro prism array 916 may change the beam angle (direction) of the transmitted light 224. As described above in connection with FIGS. 4-5, the direction of each micro prism array 916 may depend on the relative position of the corresponding liquid crystal cell 910 with respect to the pancake lens assembly 206.

EXAMPLES

Illustrative examples of the technologies disclosed herein are provided below. An embodiment of the technologies may include any one or more, and any combination of, the examples described below.

Example 1 includes a head-mounted display device, the head-mounted display device comprising: a display panel that comprises a display surface to emit display light, wherein the display light comprises a plurality of pixels, and wherein each pixel is associated with a position on the display surface; a pixel emission controller optically coupled to the display panel; and a pancake lens assembly optically coupled to the pixel emission controller, wherein the pancake lens assembly comprises folded optics to direct the display light to an eye box; wherein the pixel emission controller is to apply an emission profile to each pixel of the display light, wherein the emission profile comprises a beam width and a beam direction, and wherein the emission profile of each pixel of the display light is a function of an optical coupling between the position on the display surface associated with the pixel through the pancake lens assembly to the eye box.

Example 2 includes the subject matter of Example 1, and wherein the beam width of each pixel is negatively correlated to a distance of the corresponding position on the display surface from an optical axis of the pancake lens assembly.

Example 3 includes the subject matter of any of Examples 1 and 2, and wherein the beam angle of each pixel relative to the optical axis is positively correlated to the distance of the corresponding position on the display surface from the optical axis.

Example 4 includes the subject matter of any of Examples 1-3, and wherein: the display light is circularly polarized in response to transmission through the pixel emission controller; and the pancake lens assembly comprises (i) a beam splitter lens that does not include an absorptive linear polarizer and a quarter wave plate and (ii) a reflective polarizer lens that includes a quarter wave plate and a reflective polarizer.

Example 5 includes the subject matter of any of Examples 1-4, and wherein the beam splitter lens comprises a first antireflective coating and the reflective polarizer lens comprises a second antireflective coating.

Example 6 includes the subject matter of any of Examples 1-5, and wherein: the display panel comprises a plurality of emitters to emit the display light, wherein each of the emitters has an emission profile with a narrow beam width, wherein the narrow beam width is narrower than a Lambertian beam width; and the pixel emission controller comprises a directional component to modify the beam angle of each of the emission profiles.

Example 7 includes the subject matter of any of Examples 1-6, and wherein: each of the emitters comprises a light-emitting diode coupled to a resonant cavity; and the directional component comprises a micro prism array.

Example 8 includes the subject matter of any of Examples 1-7, and wherein: the display panel comprises a plurality of emitters to emit the display light, wherein each of the emitters has a Lambertian emission profile; and the pixel emission controller comprises: (i) a collimating component to reduce a beam width of each of the emission profiles and (ii) a directional component to modify the beam angle of each of the emission profiles.

Example 9 includes the subject matter of any of Examples 1-8, and wherein: each of the emitters comprises a light-emitting diode; the collimating component comprises a micro lens array; and the directional component comprises a micro prism array.

Example 10 includes the subject matter of any of Examples 1-9, and wherein: the display panel comprises: (i) a backlight, (ii) a polarizing layer optically coupled to the backlight, the polarizing layer to linearly polarize light emitted by the backlight, and (iii) a selectively transmissive layer optically coupled to the polarizing layer; and the pixel emission controller comprises: (i) a collimating component to reduce a beam width of each of the emission profiles and (ii) a directional component to modify the beam angle of each of the emission profiles.

Example 11 includes the subject matter of any of Examples 1-10, and wherein the polarizing layer comprises a quantum rod film.

Example 12 includes the subject matter of any of Examples 1-11, and wherein the selectively transmissive layer comprises a liquid crystal display.

Example 13 includes the subject matter of any of Examples 1-12, and wherein the polarized light emitted by the polarizing layer aligns with a first polarizing layer of the liquid crystal display.

Example 14 includes the subject matter of any of Examples 1-13, and wherein: the display panel comprises: (i) a backlight, (ii) a highly directional coupler optically coupled to the backlight, wherein light emitted by the backlight via the highly directional coupler has an emission profile with a narrow beam width, and (iii) a selectively transmissive layer optically coupled to the highly directional coupler; and the pixel emission controller comprises a directional component to modify the beam angle of each of the emission profiles.

Example 15 includes the subject matter of any of Examples 1-14, and wherein the selectively transmissive layer comprises a liquid crystal display.

Example 16 includes a computing device for virtual reality display, the computing device comprising: a processor; a graphics adapter coupled to the processor; and a head-mounted display device comprising: a display panel that comprises a display surface to emit display light, wherein the display light comprises a plurality of pixels, and wherein each pixel is associated with a position on the display surface; a pixel emission controller optically coupled to the display panel; and a pancake lens assembly optically coupled to the pixel emission controller, wherein the pancake lens assembly comprises folded optics to direct the display light to an eye box; wherein the graphics adapter is to drive the display panel of the head-mounted display device; and wherein the pixel emission controller is to apply an emission profile to each pixel of the display light, wherein the emission profile comprises a beam width and a beam direction, and wherein the emission profile of each pixel of the display light is a function of the position on the display surface associated with the pixel.

Example 17 includes the subject matter of Example 16, and wherein the emission profile of each pixel of the display light is a function of an optical coupling between the position on the display surface associated with the pixel through the pancake lens assembly to the eye box.

Example 18 includes the subject matter of any of Examples 16 and 17, and wherein the beam width of each pixel is negatively correlated to a distance of the corresponding position on the display surface from an optical axis of the pancake lens assembly.

Example 19 includes the subject matter of any of Examples 16-18, and wherein the beam angle of each pixel relative to the optical axis is positively correlated to the distance of the corresponding position on the display surface from the optical axis.

Example 20 includes the subject matter of any of Examples 16-19, and wherein: the display panel comprises a plurality of emitters to emit the display light, wherein each of the emitters has an emission profile with a narrow beam width, wherein the narrow beam width is narrower than a Lambertian beam width; and the pixel emission controller comprises a directional component to modify the beam angle of each of the emission profiles.

Example 21 includes the subject matter of any of Examples 16-20, and wherein: each of the emitters comprises a light-emitting diode coupled to a resonant cavity; and the directional component comprises a micro prism array.

Example 22 includes the subject matter of any of Examples 16-21, and wherein: the display panel comprises a plurality of emitters to emit the display light, wherein each of the emitters has a Lambertian emission profile; and the pixel emission controller comprises: (i) a collimating component to reduce a beam width of each of the emission profiles and (ii) a directional component to modify the beam angle of each of the emission profiles.

Example 23 includes the subject matter of any of Examples 16-22, and wherein: the display panel comprises: (i) a backlight, (ii) a polarizing layer optically coupled to the backlight, the polarizing layer to linearly polarize light emitted by the backlight, and (iii) a selectively transmissive layer optically coupled to the polarizing layer; and the pixel emission controller comprises: (i) a collimating component to reduce a beam width of each of the emission profiles and (ii) a directional component to modify the beam angle of each of the emission profiles.

Example 24 includes the subject matter of any of Examples 16-23, and wherein the polarizing layer comprises a quantum rod film.

Example 25 includes the subject matter of any of Examples 16-24, and wherein: the display panel comprises: (i) a backlight, (ii) a highly directional coupler optically coupled to the backlight, wherein light emitted by the backlight via the highly directional coupler has an emission profile with a narrow beam width, and (iii) a selectively transmissive layer optically coupled to the highly directional coupler; and the pixel emission controller comprises a directional component to modify the beam angle of each of the emission profiles.

The invention claimed is:

1. A head-mounted display device, the head-mounted display device comprising:
   a display panel that comprises a display surface to emit display light, wherein the display light comprises a plurality of pixels, and wherein each pixel is associated with a position on the display surface;
   a pixel emission controller optically coupled to the display panel; and
   a pancake lens assembly optically coupled to the pixel emission controller, wherein the pancake lens assembly comprises folded optics to direct the display light to an eye box, and wherein the pancake lens assembly defines an optical axis;
   wherein the pixel emission controller is to apply an emission profile to each pixel of the display light, wherein the emission profile comprises a beam width and a beam direction, wherein the emission profile of each pixel of the display light is a function of an optical coupling between the position on the display surface associated with the pixel through the pancake lens assembly to the eye box, and wherein the beam width of the emission profile of each pixel is negatively correlated to a distance of the corresponding position on the display surface from the optical axis of the pancake lens assembly.

2. The head-mounted display device of claim 1, wherein the beam angle of each pixel relative to the optical axis is positively correlated to the distance of the corresponding position on the display surface from the optical axis.

3. The head-mounted display device of claim 1, wherein:
   the display light is circularly polarized in response to transmission through the pixel emission controller; and
   the pancake lens assembly comprises (i) a beam splitter lens that does not include an absorptive linear polarizer and a quarter wave plate and (ii) a reflective polarizer lens that includes a quarter wave plate and a reflective polarizer.

4. The head-mounted display device of claim 3, wherein the beam splitter lens comprises a first antireflective coating and the reflective polarizer lens comprises a second antireflective coating.

5. The head-mounted display device of claim 1, wherein:
   the display panel comprises a plurality of emitters to emit the display light, wherein each of the emitters has an emission profile with a narrow beam width, wherein the narrow beam width is narrower than a Lambertian beam width; and
   the pixel emission controller comprises a directional component to modify the beam angle of each of the emission profiles.

6. The head-mounted display device of claim 5, wherein:
   each of the emitters comprises a light-emitting diode coupled to a resonant cavity; and
   the directional component comprises a micro prism array.

7. The head-mounted display device of claim 1, wherein:
   the display panel comprises a plurality of emitters to emit the display light, wherein each of the emitters has a Lambertian emission profile; and
   the pixel emission controller comprises: (i) a collimating component to reduce a beam width of each of the emission profiles and (ii) a directional component to modify the beam angle of each of the emission profiles.

8. The head-mounted display device of claim 7, wherein:
   each of the emitters comprises a light-emitting diode;
   the collimating component comprises a micro lens array; and
   the directional component comprises a micro prism array.

9. The head-mounted display device of claim 1, wherein:
the display panel comprises: (i) a backlight, (ii) a polarizing layer optically coupled to the backlight, the polarizing layer to linearly polarize light emitted by the backlight, and (iii) a selectively transmissive layer optically coupled to the polarizing layer; and
the pixel emission controller comprises: (i) a collimating component to reduce a beam width of each of the emission profiles and (ii) a directional component to modify the beam angle of each of the emission profiles.

10. The head-mounted display device of claim 9, wherein the polarizing layer comprises a quantum rod film.

11. The head-mounted display device of claim 9, wherein the selectively transmissive layer comprises a liquid crystal display.

12. The head-mounted display device of claim 11, wherein the polarized light emitted by the polarizing layer aligns with a first polarizing layer of the liquid crystal display.

13. The head-mounted display device of claim 1, wherein:
the display panel comprises: (i) a backlight, (ii) a highly directional coupler optically coupled to the backlight, wherein light emitted by the backlight via the highly directional coupler has an emission profile with a narrow beam width, and (iii) a selectively transmissive layer optically coupled to the highly directional coupler; and
the pixel emission controller comprises a directional component to modify the beam angle of each of the emission profiles.

14. The head-mounted display device of claim 13, wherein the selectively transmissive layer comprises a liquid crystal display.

15. A computing device for virtual reality display, the computing device comprising:
a processor;
a graphics adapter coupled to the processor; and
a head-mounted display device comprising:
a display panel that comprises a display surface to emit display light, wherein the display light comprises a plurality of pixels, and wherein each pixel is associated with a position on the display surface;
a pixel emission controller optically coupled to the display panel; and
a pancake lens assembly optically coupled to the pixel emission controller, wherein the pancake lens assembly comprises folded optics to direct the display light to an eye box, and wherein the pancake lens assembly defines an optical axis;
wherein the graphics adapter is to drive the display panel of the head-mounted display device; and
wherein the pixel emission controller is to apply an emission profile to each pixel of the display light, wherein the emission profile comprises a beam width and a beam direction, wherein the emission profile of each pixel of the display light is a function of the position on the display surface associated with the pixel, and wherein the beam width of the emission profile of each pixel is negatively correlated to a distance of the corresponding position on the display surface from the optical axis of the pancake lens assembly.

16. The computing device of claim 15, wherein the emission profile of each pixel of the display light is a function of an optical coupling between the position on the display surface associated with the pixel through the pancake lens assembly to the eye box.

17. The computing device of claim 15, wherein the beam angle of each pixel relative to the optical axis is positively correlated to the distance of the corresponding position on the display surface from the optical axis.

18. The computing device of claim 15, wherein:
the display panel comprises a plurality of emitters to emit the display light, wherein each of the emitters has an emission profile with a narrow beam width, wherein the narrow beam width is narrower than a Lambertian beam width; and
the pixel emission controller comprises a directional component to modify the beam angle of each of the emission profiles.

19. The computing device of claim 18, wherein:
each of the emitters comprises a light-emitting diode coupled to a resonant cavity; and
the directional component comprises a micro prism array.

20. The computing device of claim 15, wherein:
the display panel comprises a plurality of emitters to emit the display light, wherein each of the emitters has a Lambertian emission profile; and
the pixel emission controller comprises: (i) a collimating component to reduce a beam width of each of the emission profiles and (ii) a directional component to modify the beam angle of each of the emission profiles.

21. The computing device of claim 15, wherein:
the display panel comprises: (i) a backlight, (ii) a polarizing layer optically coupled to the backlight, the polarizing layer to linearly polarize light emitted by the backlight, and (iii) a selectively transmissive layer optically coupled to the polarizing layer; and
the pixel emission controller comprises: (i) a collimating component to reduce a beam width of each of the emission profiles and (ii) a directional component to modify the beam angle of each of the emission profiles.

22. The computing device of claim 21, wherein the polarizing layer comprises a quantum rod film.

23. The computing device of claim 15, wherein:
the display panel comprises: (i) a backlight, (ii) a highly directional coupler optically coupled to the backlight, wherein light emitted by the backlight via the highly directional coupler has an emission profile with a narrow beam width, and (iii) a selectively transmissive layer optically coupled to the highly directional coupler; and
the pixel emission controller comprises a directional component to modify the beam angle of each of the emission profiles.

* * * * *